(12) United States Patent
Kriegel et al.

(10) Patent No.: US 8,230,179 B2
(45) Date of Patent: Jul. 24, 2012

(54) ADMINISTERING NON-CACHEABLE MEMORY LOAD INSTRUCTIONS

(75) Inventors: Jon K. Kriegel, Rochester, MN (US); Jamie R. Kuesel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1075 days.

(21) Appl. No.: 12/121,222

(22) Filed: May 15, 2008

(65) Prior Publication Data
US 2009/0287885 A1 Nov. 19, 2009

(51) Int. Cl.
*G06F 9/00* (2006.01)
(52) U.S. Cl. .................. 711/143; 711/138; 712/225
(58) Field of Classification Search .............. 711/138, 711/143; 712/225
See application file for complete search history.

(56) References Cited

U.S. PATENT DOCUMENTS

| | | | |
|---|---|---|---|
| 4,813,037 A | 3/1989 | Debuysscher et al. | |
| 4,951,195 A | 8/1990 | Fogg et al. | |
| 5,167,023 A | 11/1992 | De Nicolas et al. | |
| 5,301,302 A | 4/1994 | Blackard et al. | |
| 5,442,797 A | 8/1995 | Casavant et al. | |
| 5,590,308 A | 12/1996 | Shih | |
| 5,761,516 A | 6/1998 | Rostoker et al. | |
| 5,784,706 A | 7/1998 | Oberlin et al. | |
| 5,870,479 A | 2/1999 | Feiken et al. | |
| 5,884,060 A | 3/1999 | Vegesna et al. | |
| 5,887,166 A | 3/1999 | Mallick et al. | |
| 5,974,498 A | 10/1999 | Hopkins | |
| 6,021,470 A * | 2/2000 | Frank et al. | 711/138 |
| 6,044,478 A | 3/2000 | Green | |
| 6,047,122 A | 4/2000 | Spiller | |
| 6,049,866 A | 4/2000 | Earl | |
| 6,085,296 A | 7/2000 | Karkhanis et al. | |
| 6,085,315 A | 7/2000 | Fleck et al. | |
| 6,101,599 A | 8/2000 | Wright et al. | |

(Continued)

FOREIGN PATENT DOCUMENTS

CN        1599471        3/2005

OTHER PUBLICATIONS

Kumar et al.; "A Network on Chip Architecture and Design Methodology"; 2002; IEEE.*

(Continued)

*Primary Examiner* — Chun-Kuan Lee
*Assistant Examiner* — Benjamin Geib
(74) *Attorney, Agent, or Firm* — Biggers & Ohanian, LLP

(57) ABSTRACT

Administering non-cacheable memory load instructions in a computing environment where cacheable data is produced and consumed in a coherent manner without harming performance of a producer, the environment including a hierarchy of computer memory that includes one or more caches backed by main memory, the caches controlled by a cache controller, at least one of the caches configured as a write-back cache. Embodiments of the present invention include receiving, by the cache controller, a non-cacheable memory load instruction for data stored at a memory address, the data treated by the producer as cacheable; determining by the cache controller from a cache directory whether the data is cached; if the data is cached, returning the data in the memory address from the write-back cache without affecting the write-back cache's state; and if the data is not cached, returning the data from main memory without affecting the write-back cache's state.

18 Claims, 7 Drawing Sheets

U.S. PATENT DOCUMENTS

| | | |
|---|---|---|
| 6,105,119 A | 8/2000 | Kerr et al. |
| 6,119,215 A | 9/2000 | Key et al. |
| 6,145,072 A | 11/2000 | Shams et al. |
| 6,151,668 A | 11/2000 | Pechanek et al. |
| 6,164,841 A | 12/2000 | Mattson et al. |
| 6,272,598 B1 | 8/2001 | Arlitt et al. |
| 6,292,888 B1 | 9/2001 | Nemirovsky et al. |
| 6,370,622 B1 | 4/2002 | Chiou et al. |
| 6,434,669 B1 | 8/2002 | Arimilli et al. |
| 6,446,171 B1 | 9/2002 | Henriksen |
| 6,493,817 B1 | 12/2002 | Renstrom |
| 6,519,605 B1 | 2/2003 | Gilgen et al. |
| 6,567,895 B2 | 5/2003 | Scales |
| 6,591,347 B2 | 7/2003 | Tischler et al. |
| 6,625,662 B1 | 9/2003 | Satoh et al. |
| 6,668,307 B1 | 12/2003 | Damron |
| 6,668,308 B2 | 12/2003 | Barroso et al. |
| 6,675,284 B1 | 1/2004 | Warren |
| 6,697,932 B1 | 2/2004 | Yoaz et al. |
| 6,725,317 B1 | 4/2004 | Bouchier et al. |
| 6,823,429 B1 | 11/2004 | Olnowich |
| 6,832,184 B1 | 12/2004 | Bleier et al. |
| 6,877,086 B1 | 4/2005 | Boggs et al. |
| 6,891,828 B2 | 5/2005 | Ngai |
| 6,898,791 B1 | 5/2005 | Chandy et al. |
| 6,915,402 B2 | 7/2005 | Wilson et al. |
| 6,938,253 B2 | 8/2005 | Kim |
| 6,950,438 B1 | 9/2005 | Owen et al. |
| 6,973,032 B1 | 12/2005 | Casley et al. |
| 6,988,149 B2 | 1/2006 | Odenwald |
| 7,010,580 B1 | 3/2006 | Fu et al. |
| 7,015,909 B1 | 3/2006 | Morgan, III et al. |
| 7,072,996 B2 | 7/2006 | Adusumilli et al. |
| 7,162,560 B2 | 1/2007 | Taylor et al. |
| 7,376,789 B2 | 5/2008 | Halleck et al. |
| 7,394,288 B1 | 7/2008 | Agarwal |
| 7,398,374 B2 | 7/2008 | DeLano |
| 7,464,197 B2 | 12/2008 | Ganapathy et al. |
| 7,478,225 B1 | 1/2009 | Brooks et al. |
| 7,493,474 B1 | 2/2009 | Pechanek et al. |
| 7,500,060 B1 | 3/2009 | Anderson et al. |
| 7,502,378 B2 | 3/2009 | Lajolo et al. |
| 7,521,961 B1 | 4/2009 | Anderson et al. |
| 7,533,154 B1 | 5/2009 | Chen et al. |
| 7,539,124 B2 | 5/2009 | Rhim et al. |
| 7,546,444 B1 | 6/2009 | Wolrich et al. |
| 7,568,064 B2 | 7/2009 | Reblewski et al. |
| 7,590,774 B2 | 9/2009 | Johns et al. |
| 7,613,882 B1 | 11/2009 | Akkawi et al. |
| 7,664,108 B2 | 2/2010 | Bahattab |
| 7,689,738 B1 | 3/2010 | Williams et al. |
| 7,701,252 B1 | 4/2010 | Chow et al. |
| 7,861,065 B2 | 12/2010 | Heil et al. |
| 7,886,084 B2 | 2/2011 | Chen et al. |
| 7,913,010 B2 | 3/2011 | Hoover et al. |
| 7,917,703 B2 | 3/2011 | Comparan et al. |
| 7,958,340 B2 | 6/2011 | Hoover et al. |
| 7,991,978 B2 | 8/2011 | Kuesel et al. |
| 8,010,750 B2 | 8/2011 | Comparan et al. |
| 8,018,466 B2 | 9/2011 | Hoover et al. |
| 8,020,168 B2 | 9/2011 | Hoover et al. |
| 8,040,799 B2 | 10/2011 | Hoover et al. |
| 2002/0099833 A1 | 7/2002 | Steely et al. |
| 2002/0178337 A1 | 11/2002 | Wilson et al. |
| 2003/0065890 A1 | 4/2003 | Lyon |
| 2004/0037313 A1 | 2/2004 | Gulati et al. |
| 2004/0083341 A1 | 4/2004 | Robinson et al. |
| 2004/0088487 A1 | 5/2004 | Barroso et al. |
| 2004/0151197 A1 | 8/2004 | Hui |
| 2004/0153579 A1 | 8/2004 | Shih et al. |
| 2004/0216105 A1 | 10/2004 | Burky et al. |
| 2004/0250046 A1 | 12/2004 | Gonzalez et al. |
| 2004/0260906 A1 | 12/2004 | Landin et al. |
| 2005/0044319 A1 | 2/2005 | Olukotun |
| 2005/0086435 A1 | 4/2005 | Todoroki |
| 2005/0097184 A1 | 5/2005 | Brown et al. |
| 2005/0149689 A1 | 7/2005 | Sodani et al. |
| 2005/0160209 A1 | 7/2005 | Van Doren et al. |
| 2005/0166205 A1 | 7/2005 | Oskin et al. |
| 2005/0198442 A1 | 9/2005 | Mandler |
| 2005/0203988 A1 | 9/2005 | Nollet et al. |
| 2005/0238035 A1 | 10/2005 | Riley |
| 2006/0095920 A1 | 5/2006 | Goossens |
| 2006/0101249 A1 | 5/2006 | Bacon et al. |
| 2006/0203825 A1 | 9/2006 | Beigne et al. |
| 2006/0209846 A1 | 9/2006 | Clermidy et al. |
| 2006/0242393 A1 | 10/2006 | Park et al. |
| 2007/0055826 A1 | 3/2007 | Morton et al. |
| 2007/0055961 A1 | 3/2007 | Callister et al. |
| 2007/0074191 A1 | 3/2007 | Geisinger |
| 2007/0076739 A1 | 4/2007 | Manjeshwar et al. |
| 2007/0271557 A1 | 11/2007 | Geisinger |
| 2007/0283324 A1 | 12/2007 | Geisinger |
| 2008/0028401 A1 | 1/2008 | Geisinger |
| 2008/0133885 A1 | 6/2008 | Glew |
| 2008/0134191 A1 | 6/2008 | Warrier et al. |
| 2008/0181115 A1 | 7/2008 | Soulie et al. |
| 2008/0186998 A1 | 8/2008 | Rijpkema |
| 2008/0205432 A1 | 8/2008 | Gangwal |
| 2008/0216073 A1 | 9/2008 | Yates et al. |
| 2008/0307422 A1 | 12/2008 | Kurland et al. |
| 2008/0320235 A1 | 12/2008 | Beckman et al. |
| 2009/0019190 A1 | 1/2009 | Blocksome |
| 2009/0083263 A1 | 3/2009 | Felch et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0231349 A1 | 9/2009 | Mejdrich et al. |
| 2009/0260013 A1 | 10/2009 | Heil et al. |
| 2009/0282222 A1 | 11/2009 | Hoover et al. |

OTHER PUBLICATIONS

Office Action Dated Jan. 29, 2010 in U.S. Appl. No. 11/945,396.
Final Office Action Dated Jan. 15, 2010 in U.S. Appl. No. 12/031,733.
Master Dissertation, University of Electronic Science and Technology of China, pp. 0-35 and pp. 36-81 (includes English abstract).
1994-2010 China Academic Journal Electronic Publishing House, pp. 0-30 and pp. 31-66 (includes English abstract).
Final Office Action, U.S. Appl. No. 11/972,753, Feb. 18, 2011.
Final Office Action, U.S. Appl. No. 12/015,975, Jan. 7, 2011.
Final Office Action, U.S. Appl. No. 12/108,846, Feb. 17, 2011.
Final Office Action, U.S. Appl. No. 12/113,286, Feb. 18, 2011.
Final Office Action, U.S. Appl. No. 12/118,059, Feb. 17, 2011.
Office Action, U.S. Appl. No. 12/108,770, Apr. 12, 2011.
Final Office Action, U.S. Appl. No. 12/117,906, Mar. 28, 2011.
Office Action, U.S. Appl. No. 12/060,559, Apr. 1, 2011.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Virtanen, et al. "NoC Interface for a Protocol Processor". University of Turku.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
Final Office Action, U.S. Appl. No. 11/926,212, May 17, 2011.
Nollet, V., et al., "Centralized Run-Time Resource Management in a Network-on-Chip Containing Reconfigurable Hardware Tiles" [online]. 2005 [retrieved Jul. 15, 2011], Retrieved from Internet: http://portal.acm.org/ft_gateway.cfm?id=1049106&type=pdf&CFID=32720390&CFTOKEN=986277114, pp. 1-6.

Office Action, U.S. Appl. No. 11/936,873, Jul. 21, 2011.
Office Action, U.S. Appl. No. 12,031,738, Jul. 11, 2011.
Final Office Action, U.S. Appl. No. 12/060,559, Jul. 8, 2011.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Steve Furber, Future Trends in SOC Interconnect, Aug. 2000.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Issenin et al.; (Date Reuse Driven Memory and network-on-Chip Co-Synthesis); NSF; pp. 1-7.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Ai-Hashimi; ("System-on-Chip—Net Generation Electronics", "Asynchronous on-chip networks"2006); Chapter 18 p. 1-32.
Final Office Action, U.S. Appl. No. 11/926,212, Aug. 23, 2010.
Final Office Action, U.S. Appl. No. 11/955,553, Sep. 13, 2010.
Final Office Action, U.S. Appl. No. 12,031,733, Aug. 19, 2010.
Notice of Allowance, U.S. Appl. No. 12/118,298, Aug. 18, 2010.
Office Action, U.S. Appl. No. 11/972,753, Oct. 4, 2010.
Office Action, U.S. Appl. No. 12/015,975, Jul. 22, 2010.
Office Action, U.S. Appl. No. 11/937,579, Sep. 16, 2010.
Office Action, U.S. Appl. No. 12/118,059, Sep. 1, 2010.
Office Action, U.S. Appl. No. 12/121,168, Oct. 5, 2010.

Nikolay Kvaldjiev et al., A Virtual Channel Network-on-chip for GT and BE traffic, Apr. 2006, IEEE Emerging VLSI Technologies and Architectures.
Office Action, U.S. Appl. No. 11/926,212, Dec. 7, 2010.
Office Action, U.S. Appl. No. 11/945,396, Dec. 9, 2010.
Notice of Allowance, U.S. Appl. No. 11/955,553, Nov. 22, 2010.
Notice of Allowance, U.S. Appl. No. 12/031,733, Nov. 16, 2010.
Office Action, U.S. Appl. No. 12/118,017, Dec. 8, 2010.
Office Action, U.S. Appl. No. 12/118,272, Dec. 2, 2010.
Office Action, U.S. Appl. No. 12/108,846, Dec. 2, 2010.
Final Office Action, U.S. Appl. No. 12/117,875, Nov. 10, 2010.
Office Action, U.S Appl. No. 12/117,906, May 9, 2008.
Office Action, U.S. Appl. No. 12/060,559, Nov. 3, 2010.
Advisory Action, U.S. Appl. No. 11/926,212, Nov. 2, 2010.
Kumar et al.; "A Network on Chip Architecture and Design Methodology";2002; IEEE.
Final Office Action, U.S. Appl. No. 11/945,396, Sep. 1, 2011.
Final Office Action, U.S Appl. No. 11/972,753, Sep. 7, 2011.
Office Action, U.S. Appl. No. 12/135,364, Aug. 5, 2011.
Office Action, U.S. Appl. No. 12/102,033, Oct. 7, 2011.
Office Action, U.S. Appl. No. 11/937,579, Aug. 15, 2011.
Office Action, U.S. Appl. No. 12/233,180, Oct. 6, 2011.
Office Action, U.S. Appl. No. 12/121,222, Sep. 20, 2011.
Final Office Action, U.S. Appl. No. 12/108,770, Sep. 30, 2011.
Wikipedia, "Parallel Computing", Wikipedia [online], URL: http://en.wikipedia.org/wiki/Parallel_computing, Jan. 19, 2007, pp. 1-6, USA.
Pande et al., "Performance Evaluation and Design Trade-Offs for Network-on-Chip Interconnect Architectures", IEEE Transactions on Computers, vol. 54, No. 8, Aug. 2005, pp. 1025-1040, IEEE Computer Society, USA.
Samman et al., "Networks-On-Chip Based on Dynamic Wormhole Packet Identity Mapping Management", VLSI Design, Aug. 7, 2008, 15 pp., vol. 2009, Article ID 941701, Hindawi Publishing Corporation, USA.
Mereu, "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Radulescu et al., "An Efficient On-Chip Network Interface Offering Guaranteed Services, Shared-Memory Abstraction, and Flexible Network Configuration", from Proceedings of the Design, Automation and Test in Europe Conference and Exhibition (Date'04), held in Paris, France Feb. 2004, pp. 878-883, vol. 2, IEEE Computer Society, USA.
Office Action, U.S. Appl. No. 11/945,396, Mar. 3, 2011.
Final Office Action, U.S. Appl. No. 11/936,873, Dec. 30, 2011.
Notice of Allowance, U.S. Appl. No. 12/029,647, Feb. 25, 2011.
Office Action, U.S. Appl. No. 12/118,315, Jul. 26, 2011.
Final Office Action, U.S. Appl. No. 12/031,738, Dec. 22, 2011.
Notice of Allowance, U.S Appl. No. 12/015,975, Apr. 15, 2011.
Final Office Action, U.S. Appl. No. 12/118,017, Mar. 28, 2011.
Notice of Allowance, U.S. Appl. No. 12/118,272, Mar. 22, 2011.
Final Office Action, U.S. Appl. No. 11/937,579, Feb. 23, 2011.
Office Action, U.S. Appl. No. 11/938,376, Oct. 18, 2011.
Notice of Allowance, U.S. Appl. No. 12/108,846, May 13, 2011.
Notice of Allowance, U.S. Appl. No. 12/117,875, Jan. 27, 2011.
Notice of Allowance, U.S. Appl. No. 12/117,897, May 4, 2011.
Office Action, U.S. Appl. No. 12/113,286, Oct. 14, 2010.
Notice of Allowance, U.S. Appl. No. 12/121,168, Mar. 22, 2011.
Notice of Allowance, U.S. Appl. No. 12/121,168, Sep. 9, 2011.

* cited by examiner

ADMINISTERING NON-CACHEABLE MEMORY LOAD INSTRUCTIONS

BACKGROUND OF THE INVENTION

1. Field of the Invention

The field of the invention is data processing, or, more specifically methods, apparatus and products for administering non-cacheable memory load instructions.

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods, apparatus, and products for administering non-cacheable memory load instructions in a computing environment where cacheable data is produced and consumed in a coherent manner without harming performance of a producer, the environment including a hierarchy of computer memory that includes one or more caches backed by main memory, the caches controlled by a cache controller, at least one of the caches configured as a write-back cache. Embodiments of the present invention include receiving, by the cache controller from a consumer, a non-cacheable memory load instruction for data stored at a memory address, the data treated by the producer as cacheable; determining by the cache controller from a cache directory whether the data is cached; if the data is cached, returning the data in the memory address from the write-back cache without affecting the write-back cache's state; and if the data is not cached, returning the data from main memory without affecting the write-back cache's state.

Embodiments of the present invention may be implemented on a network on chip ('NOC'), the NOC including integrated processor ('IP') blocks, routers, memory communications controllers, and network interface controller. Each IP block in the NOC is adapted to a router through a memory communications controller and a network interface controller. Each memory communications controller controls communication between an IP block and memory. Each network interface controller controls inter-IP block communications through routers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
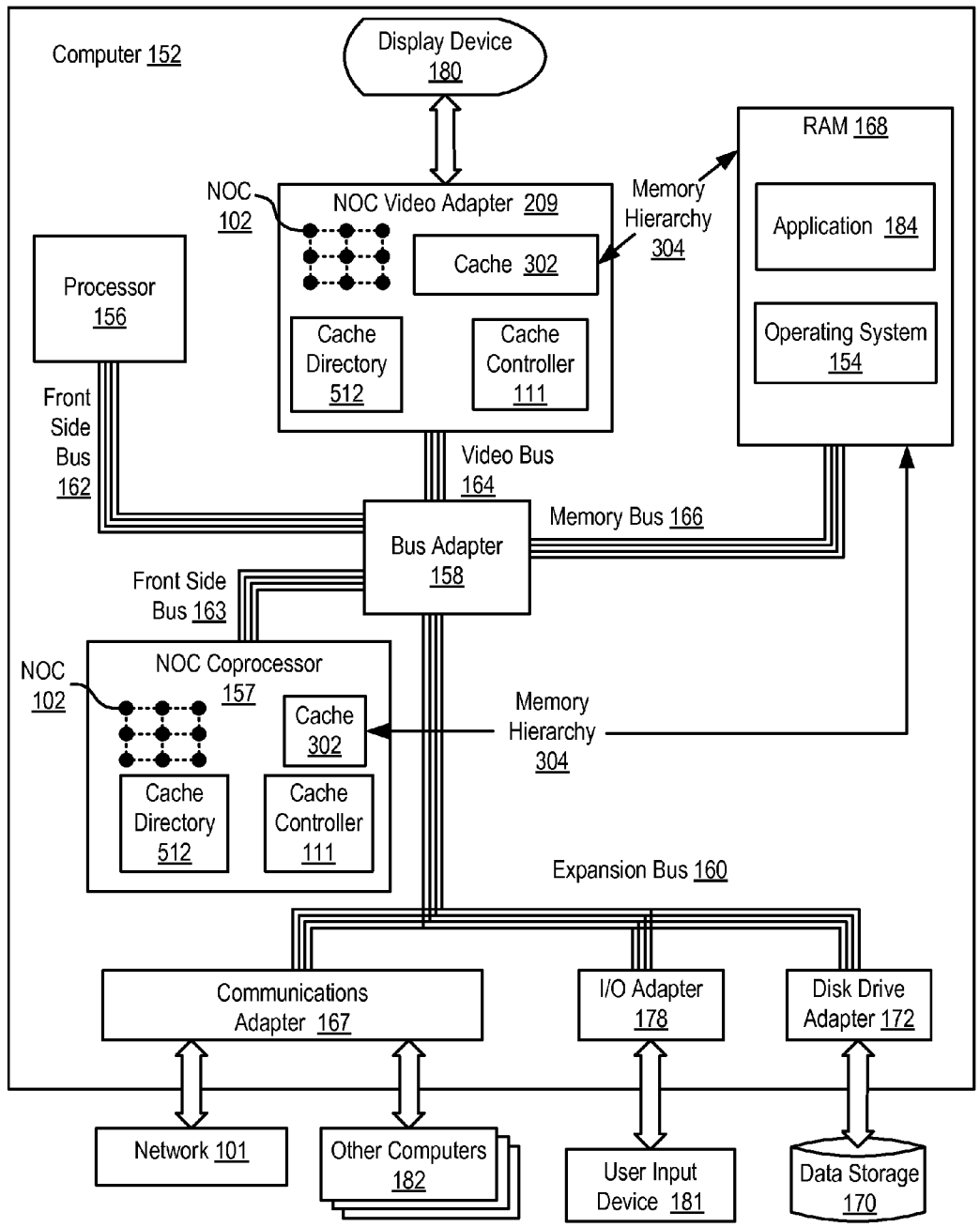
FIG. 1 sets forth a block diagram of automated computing machinery comprising an exemplary computer useful in administering non-cacheable memory load instructions according to embodiments of the present invention.

Exemplary apparatus and methods for administering non-cacheable memory load instructions in accordance with the present invention are described with reference to the accompanying drawings, beginning with FIG. 1. FIG. 1 sets forth a block diagram of automated computing machinery comprising an exemplary computer (152) useful in administering non-cacheable memory load instructions according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful administering non-cacheable memory load instructions according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs (102) according to embodiments of the present invention: a video adapter (209) and a coprocessor (157). The NOC video adapter (209) is an example of an I/O adapter specially designed for graphic output to a display device (180) such as a display screen or computer monitor. The NOC video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC (102) according to embodiments of the present invention, including integrated processor ('IP') blocks, routers, memory communications controllers, and network interface controllers. Each IP block is adapted to a router through a memory communications controller and a network interface controller, and each memory communications controller controls communication between an IP block and memory. Each network interface controller controls inter-IP block communications through routers. The NOC in the NOC video adapter (209) and NOC coprocessor (157) of FIG. 1 each includes at least one IP block that, in turn, includes a hierarchy of memory (304).

The hierarchical arrangement of storage in computer architectures is called a memory hierarchy. The memory hierarchy is designed to take advantage of memory locality. Each level of the hierarchy has properties of higher speed, smaller size, and lower latency than lower levels. Most modern CPUs are so fast that for most program workloads, the locality of reference of memory accesses and the efficiency of the caching and memory transfer between different levels of the hierarchy are the practical limitation on processing speed. As a result, the CPU spends much of its time idling, waiting for memory I/O to complete. A typical memory hierarchy in a computer system may include:

Processor registers—a hierarchal level of memory having the fastest possible access of all levels, usually 1 CPU cycle, and only hundreds of bytes in size;

Level 1 ('L1') cache—a hierarchal level of memory typically accessed in just a few CPU cycles, typically tens of kilobytes in size;

Level 2 ('L2') cache—a hierarchal level of memory having 2 to 10 times higher latency than L1, typically 512 kilobytes or more in size;

Main memory, such as 'DRAM'—a hierarchal level of memory typically accessed in hundreds of CPU cycles, typical one or more gigabytes in size.

Flash Memory—a hierarchal level having access times faster than disk storage, typically less than 8 gigabytes in size;

Hard disk storage—a hierarchal level of memory in which access times range in the hundreds of thousands of CPU cycles, typically ranging in size from tens of gigabytes to terabytes;

And so on with increasing access times and size as will occur to readers of skill in the art.

In the example of FIG. 1, each hierarchy of memory (304) in the NOC video adapter (209) and NOC coprocessor (157) includes one or more caches (302) backed by main memory (168), where at least one of the caches is configured as a write-back cache. A cache is a collection of data duplicating original values stored elsewhere or computed earlier, where the original data is expensive to fetch, due to longer access time, or to compute, compared to the cost of reading or writing to the cache. That is, a cache is a temporary storage area where frequently accessed data can be stored for rapid access. Once the data is stored in the cache, future use can be made by accessing the cached copy rather than re-fetching or recomputing the original data, so that the average access time is shorter. A cache helps expedite data access that a processor would otherwise need to fetch from main memory.

When a data is written to a cache, the data is at some point typically written to a backing store such as main memory. The timing of this write to the backing store is controlled by what is known as the write policy. In a write-through cache, every write to the cache causes a synchronous write to the backing store. Alternatively, in a write-back, or write-behind, cache, writes are not immediately mirrored to the backing store. Instead, the cache tracks locations that have been written over. Locations which have been written over are typically referred to as 'dirty.' The data in these locations is written to the backing store when the data is evicted from the cache.

The caches in the hierarchy of memory (304) in the example of FIG. 1 are controlled by a cache controller (111). The cache controller in the example of FIG. 1 is configured to receive, from a consumer of data, a non-cacheable memory load instruction for data stored at a memory address. The data stored at the memory address is treated by a producer of the data as cacheable.

A producer of data is a computer process or structure capable of writing data to cache in a memory hierarchy. Examples of a producer include a software process, a software thread of execution, a hardware thread, a particular processor, a particular core, an IP block in a NOC, a stage in a software pipeline, and others as will occur to readers of skill in the art. A producer may treat data as cacheable for the purpose of efficient and expedient access to the data. Consider as an example of data for which a producer may require efficient and expedient access, video frame data for display on a display device such as a computer monitor. A producer of such data may write frame data to cache many times in a relatively short period of time.

A consumer of data is a computer process or structure of data capable of reading the data from memory. Examples of a consumer include a software process, a software thread of execution, a hardware thread, a particular processor, a particular core, an IP block in a NOC, a stage in a software pipeline, and others as will occur to readers of skill in the art. Consumers may read data from memory through use of memory load instructions. One type of a memory load instruction is a non-cacheable memory load instruction. Non-cacheable memory load instructions are known to be such because, typically, a memory management unit ('MMU') in examining attributes of a memory page in a page table determines that the page is marked non-cacheable. The MMU then notifies the cache controller of that fact when a load instruction requests data in memory addresses in the page marked non-cacheable. When a cache controller typically processes a non-cacheable memory load instruction, the cache controller attempts to retrieve data only from backing store, such as main memory, not from cache.

Another type of memory load instruction is a cacheable memory load instruction. When a cache controller typically processes a cacheable memory load instruction the cache controller first attempts to retrieve the data from the cache. If the data is no longer stored in the cache but has been moved to the backing store, the cache controller retrieves the data from the backing store and copies the data retrieved into the cache under an assumption that retrieved data is the likely to be accessed again soon and, as such, efficiency of the next access of the data may be increased by storing the data in the lower latency cache.

When data is copied from a backing store into cache in typical processing of a cacheable memory load, however, the risk of evicting other data previously stored in cache is increased. Copying data from a backing store into cache may increase the risk of evicting other data previously stored in the cache because the cache is limited in size. Copying data from a backing store into cache may also increase the risk of evicting other data previously stored in the cache because caches typically replace data in the cache in accordance with a least recently used ('LRU') replacement policy. An LRU replacement policy generally dictates that the least recently used items in the cache are replaced first. Data copied into cache in response to a cacheable memory load instruction may be more recently used than other, previously stored data, and the risk of replacing such previously stored data increases.

These problems are amplified in cases where a producer of data needs repeated and efficient access to data in cache, while a consumer only needs access to the data once. The consumer gains no benefit of having data retrieved and stored in cache, as no further access to the data is necessary, and the producer stands a higher risk of data being evicted from the cache.

Non-cacheable memory load instructions in accordance with embodiments of the present invention are not administered in the typical fashion as described above. Instead, non-cacheable memory load instructions are administered according to embodiments of the present invention, including the example of FIG. 1, in such a way as to create a computing environment where cacheable data is produced and consumed in a coherent manner without harming performance of the producer. Performance of the producer is not harmed because, in accordance with embodiments of the present invention, data retrieved from a backing store in a non-cacheable memory load is not copied to the cache.

Cacheable data is consumed in a coherent manner when a consumer has coherent access to a valid, or non-stale, instance of the cacheable data. Coherent access to data is access to valid data across all levels of a computer memory hierarchy. Consider for example a write-back cache where cacheable valid data may be evicted at any time from the cache into a backing store. A consumer of the cacheable valid data is provided coherent access to that data if the consumer is able to retrieve that valid data wherever the valid data is stored, whether the write-back cache or the backing store.

The cache controller that controls cache in the exemplary memory hierarchies (304) of FIG. 1 is also configured to determine from a cache directory (512) whether the data is cached; if the data is cached, return the data in the memory address from the write-back cache without affecting the write-back cache's state; and if the data is not cached, return the data from main memory without affecting the write-back cache's state. Such a cache directory (512) includes associations of cache addresses and memory addresses which are used to determine whether a memory address is in cache. Cache directories according to embodiments of the present invention may also include relevant coherency management state associated with a cache line, such as an indication that a cache line is 'dirty.'

The NOC video adapter (209) and the NOC coprocessor (157) of FIG. 1 are optimized for programs that use parallel processing and also require fast random access to shared memory. Additional explanatory details of exemplary NOC structures and operations are described below with reference to FIGS. 2-5.

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for administering non-cacheable memory load instructions according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for administering non-cacheable memory load instructions according to embodiments of the present invention include modems for wired dial-up communications, Ethernet (IEEE 802.3) adapters for wired data communications network communications, and 802.11 adapters for wireless data communications network communications.

Figure 2:
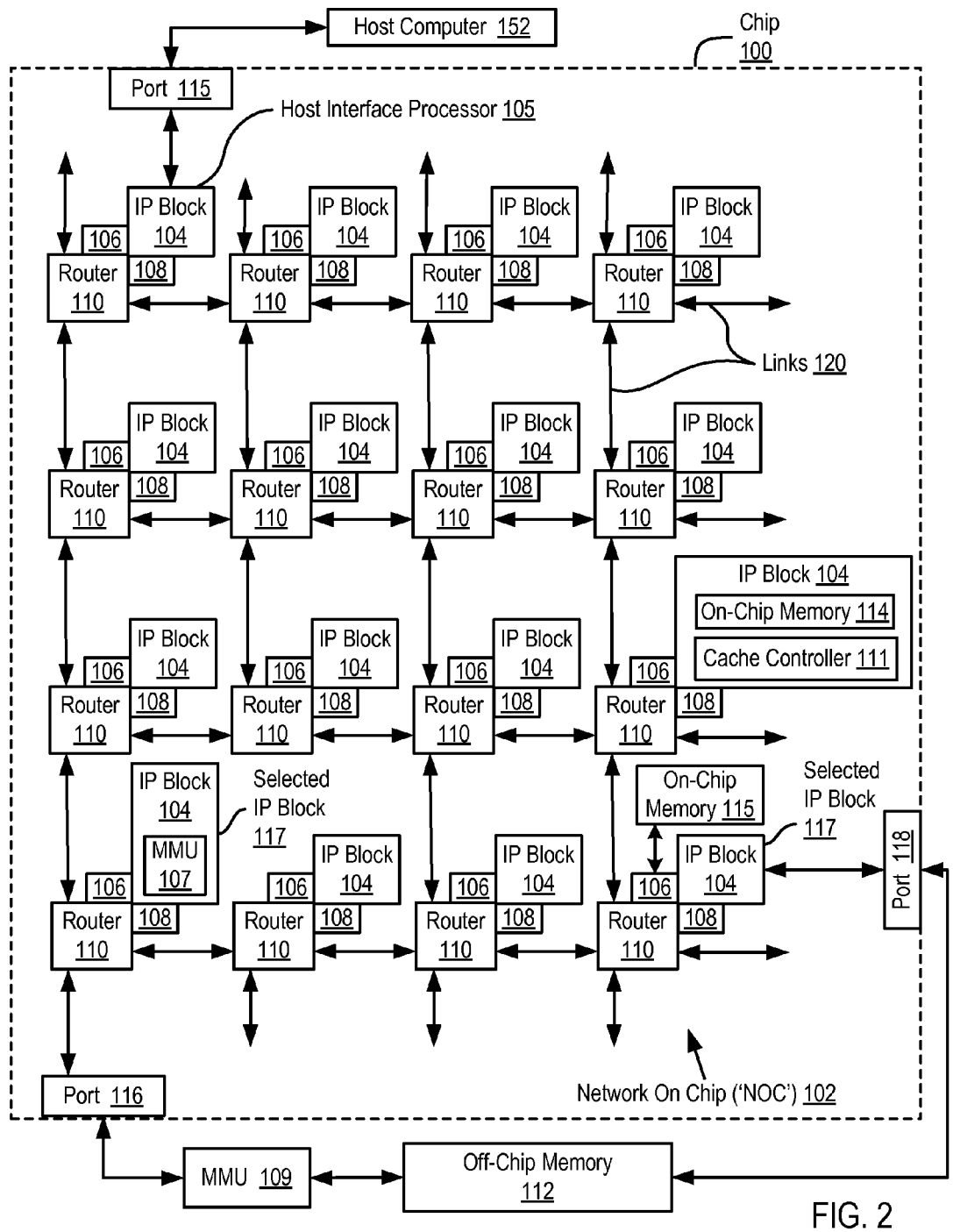
FIG. 2 sets forth a functional block diagram of apparatus for administering non-cacheable memory load instructions in a computing environment where cacheable data is produced and consumed in a coherent manner without harming performance of a producer according to embodiments of the present invention.

For further explanation, FIG. 2 sets forth a functional block diagram of apparatus for administering non-cacheable memory load instructions in a computing environment where cacheable data is produced and consumed in a coherent manner without harming performance of a producer according to embodiments of the present invention. The computing environment in the example of FIG. 2 includes a hierarchy of computer memory that includes one or more caches (114, 115) backed by main memory (112), the caches controlled by a cache controller (111), where at least one of the caches is configured as a write-back cache.

The computing environment in the example of FIG. 2 is implemented on a network on chip ('NOC') (102). The NOC in the example of FIG. 2 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory (114) enabled as an IP block, and an on on-chip caches organized in a hierarchy of memory. In the NOC of FIG. 2, either of the on-chip memories (114, 115) may be implemented as on-chip cache memory organized in a hierarchy of memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer (152) through a data communications port (115). The port (115) includes the pads, vias, pins, conductive pathways, and other interconnections required to conduct signals between the NOC and the host computer, as well as sufficient intelligence to convert message packets from the NOC (102) to the bus format required by the host computer (152). In the example of the NOC coprocessor (157) in the computer of FIG. 1, such a port would provide data communications format translation between the link structure of the NOC coprocessor (157) and the protocol required for the front side bus (163) that connects the NOC coprocessor (157) and the bus adapter (158).

The NOC (102) in the example of FIG. 2 includes at least one IP block (104) having on-chip memory (114). The on-chip memory (114) in the example of FIG. 2 may be on-chip cache memory organized in a memory hierarchy. Such a memory hierarchy may include one or more caches backed by main memory, where at least one of the caches is configured as a write-back cache.

The NOC (102) in the example of FIG. 2 also includes at least one cache controller (111) configured to receive, from a consumer of data, a non-cacheable memory load instruction for data stored at a memory address. The data is treated by a producer of the data as cacheable. The cache controller (111) is also configured to determine from a cache directory whether the data is cached. If the data is cached the cache controller returns the data in the memory address from the write-back cache without affecting the write-back cache's state. If the data is not cached, the cache controller returns the data from main memory without affecting the write-back cache's state.

Figure 3:
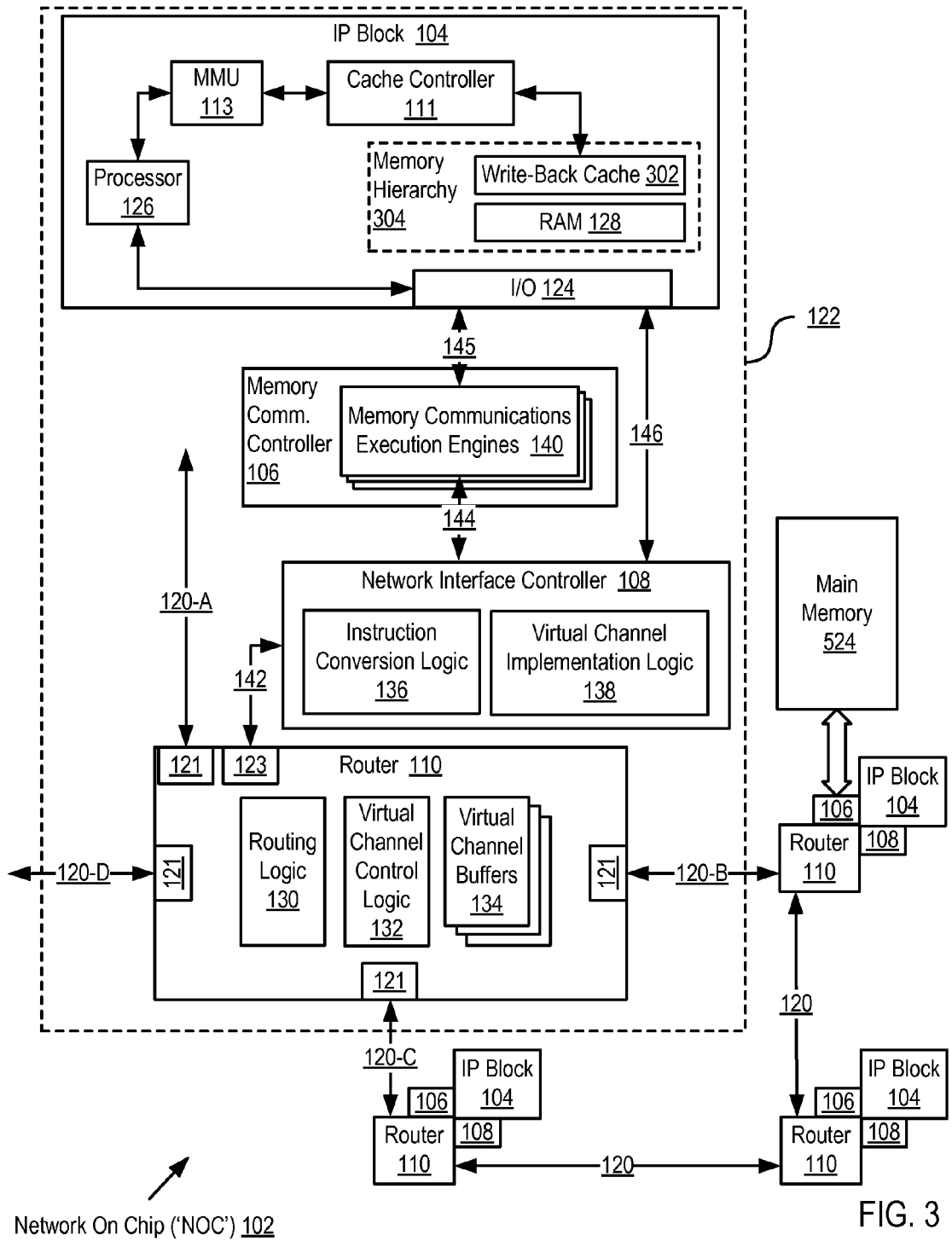
FIG. 3 sets forth a functional block diagram of a further example apparatus for administering non-cacheable memory load instructions in a computing environment where cacheable data is produced and consumed in a coherent manner without harming performance of a producer according to embodiments of the present invention.

For further explanation, FIG. 3 sets forth a functional block diagram of a further example apparatus for administering non-cacheable memory load instructions in a computing environment where cacheable data is produced and consumed in a coherent manner without harming performance of a producer according to embodiments of the present invention. The computing environment in the example of FIG. 3 is implemented on a network on chip ('NOC') (102).

The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches, memory load and store messages, responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches, memory load and store messages, responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Each router in this example includes five ports, four ports (121A, 121B, 121C, 121D) connected through bus wires (120A, 120B, 120C, 120D) to other routers and a fifth port (123) connecting each router to its associated IP block (104) through a network interface controller (108) and a memory communications controller (106). As can be seen from the illustrations in FIGS. 2 and 3, the routers (110) and the links (120) of the NOC (102) form a mesh network with vertical and horizontal links connecting vertical and horizontal ports in each router. In the illustration of FIG. 3, for example, ports (121A, 123, 121C) are termed vertical ports, and ports (121B, 121D) are termed horizontal ports.

The example NOC (102) of FIG. 3 is configured according to embodiments of the present invention to administer non-cacheable memory load instructions in a coherent manner without harming performance of a producer of data. The IP block (104) of the expanded set (122) in the example of FIG. 3 includes a hierarchy of memory (304) which in turn includes one or more caches (302) backed by main memory (524) or RAM (128). The exemplary cache (302) in the memory hierarchy (304) of FIG. 3 is a write-back cache (302). Although only one level of cache is depicted in the exemplary memory hierarchy (304) in the example of FIG. 3, readers of skill in the art will immediately recognize that memory hierarchies in accordance with embodiments of the present invention may include any number of caches, and each cache may be a different type of cache, write-through, write-back, or no-write. Such caches in the memory hierarchy are controlled by a cache controller (111).

The exemplary cache controller (111) in the example of FIG. 3 is configured to receive, from a consumer of data, a non-cacheable memory load instruction for data stored at a memory address. The data is treated by a producer of the data as cacheable. The cache controller (111) is also configured to determine from a cache directory whether the data is cached. If the data is cached, the cache controller (111) returns the data in the memory address from the write-back cache without affecting the write-back cache's (302) state. If the data is not cached, the cache controller (111) returns the data from main memory (128) without affecting the write-back cache's (302) state.

In administering non-cacheable memory load instructions according to embodiments of the present invention, the cache controller (111) of FIG. 3 may be configured to operate in a mode in which the cache controller (111) processes all non-cacheable memory load instructions in a coherent manner without harming performance of a producer. Alternatively, the exemplary cache controller (111) of FIG. 3 may be configured to operate in a mode in which only non-cacheable memory load instructions from particular consumers are processed in a coherent manner without affecting the write-back cache's state. The cache controller (111) in turn may also be configured to determine that a consumer is such a particular consumer. The cache controller may determine that a consumer is such a particular consumer through use of a software thread ID, hardware thread ID, process ID, processor ID, core ID, port ID, and so on as will occur to those of skill in the art.

The IP block (104) of the expanded set (122) in the example of FIG. 3 also includes a memory management unit (113). The memory management unit (113) may be configured to mark memory pages with attributes indicating whether to process non-cacheable memory load instructions for data stored in the memory pages in a coherent manner without affecting the write-back cache's state. The NOC of FIG. 3, in turn, may be configured to operate in a mode in which only non-cacheable memory load instructions for data stored in memory pages marked with such attributes are processed in a coherent manner without affecting the write-back cache's state. That is, only non-cacheable loads of data in some particularly identified memory pages are processed according to embodiments of the present invention, while all other non-cacheable loads of data in other memory pages are administered in a typical fashion.

Figure 4:
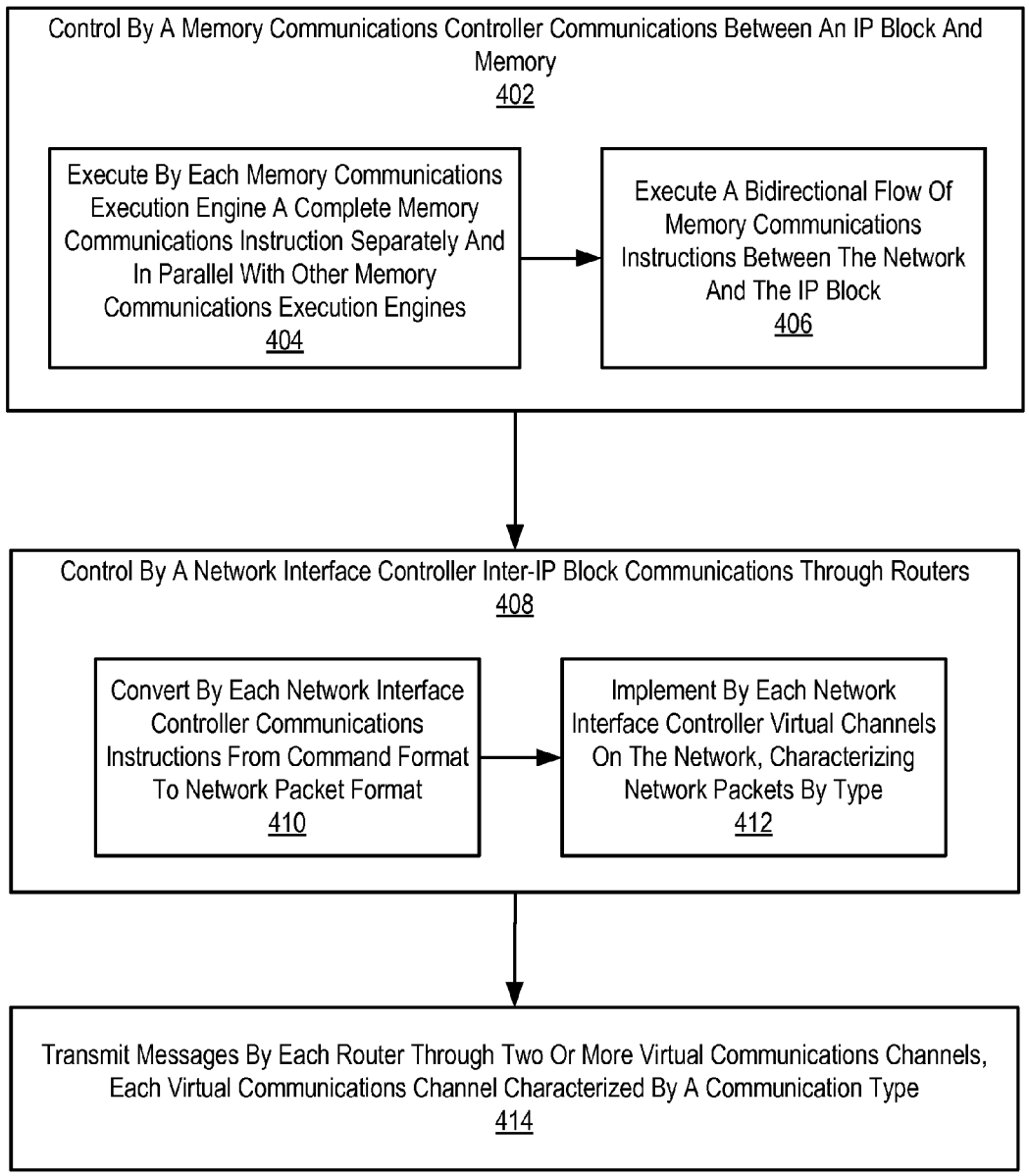
FIG. 4 sets forth a flow chart illustrating an exemplary method for data processing with such a NOC.

As explained above, administering non-cacheable load instructions in accordance with embodiments of the present invention may be implemented with a NOC. For further explanation, therefore, FIG. 4 sets forth a flow chart illustrating an exemplary method for data processing with such a NOC. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches, memory load and store messages, responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Although administering non-cacheable memory load instructions in accordance with embodiments of the present invention has been largely described in this specification with respect to a NOC, readers of skill in the art will recognize that such administration of non-cacheable memory load instructions in accordance with embodiments of the present invention may be implemented with other hardware, software, firmware, memory hierarchies, cache controllers, and so on, and each such implementation is well within the scope of the present invention.

Figure 5:
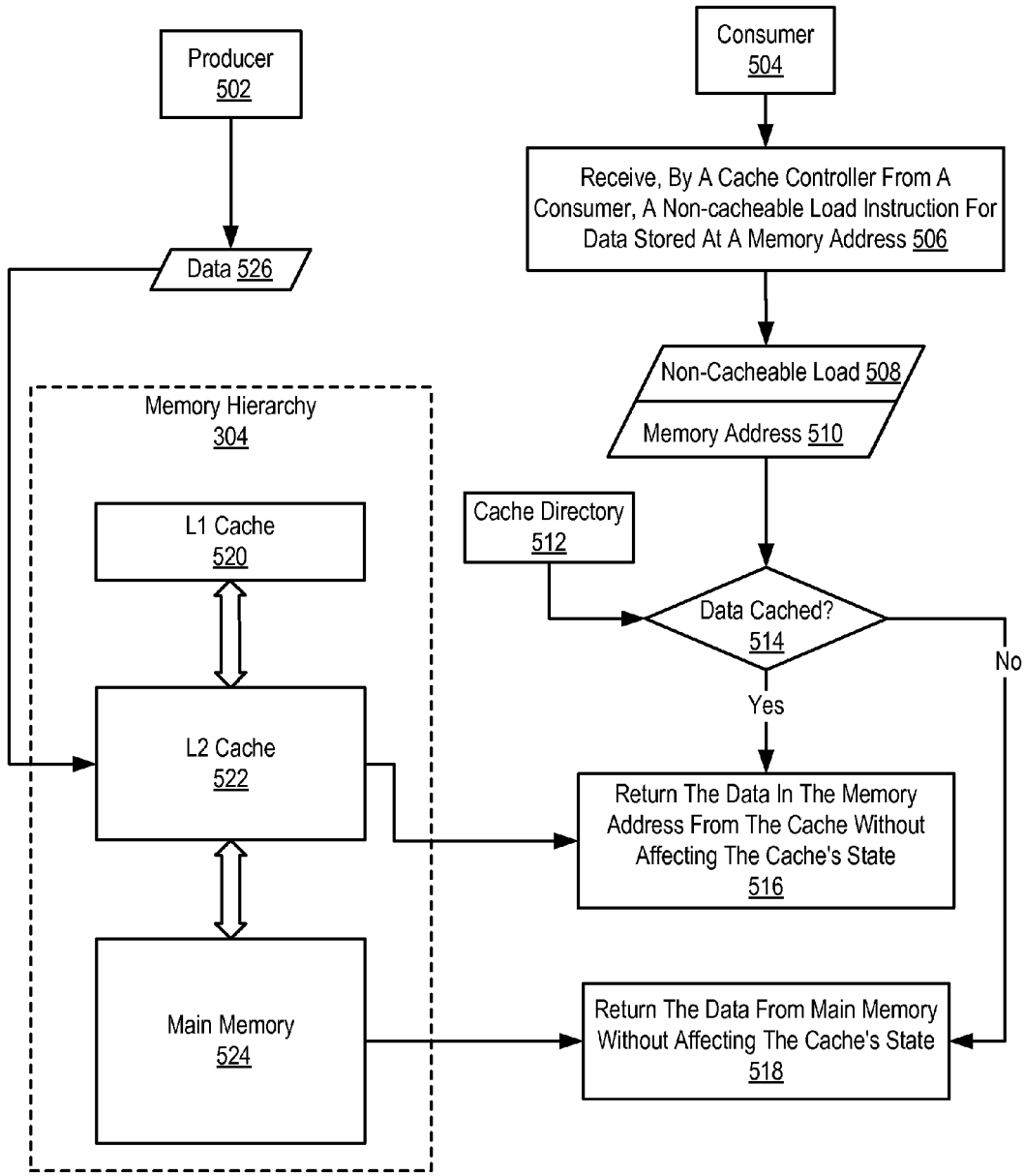
FIG. 5 sets forth a flow chart illustrating an exemplary method of administering non-cacheable memory load instructions in an environment where cacheable data is produced and consumed in a coherent manner without harming performance of the producer according to embodiments of the present invention.

For further explanation, FIG. 5 sets forth a flow chart illustrating an exemplary method of administering non-cacheable memory load instructions in an environment where cacheable data is produced and consumed in a coherent manner without harming performance of the producer according to embodiments of the present invention. Such computing environments are described in some detail above in this specification in terms of networks on chip, although readers of skill in the art will recognize that such computing environments may be implemented on a variety of general purpose computers in addition to NOCs. In the method of FIG. 5, such an environment includes a hierarchy of memory that, in turn, includes one or more caches (520, 522) backed by main memory (524). In the example of FIG. 5, the L2 cache (522) is configured as a write-back cache, the L1 cache (520) is configured as a write-through cache, and the caches are controlled by a cache controller.

The method of FIG. 5 includes receiving (506), by the cache controller from a consumer (504), a non-cacheable memory load instruction (508) for data stored at a memory address (510). In the method of FIG. 5, the data (526) is produced by a producer (502) and treated by the producer (502) as cacheable. Receiving (506) a non-cacheable memory load instruction (508) for data stored at a memory address (510) may be carried out by receiving from a memory management unit, as an instruction, an encoded opcode characterized by one or more attributes, a register identification, and a memory address, where at least one attribute indicates whether the instruction is non-cacheable. Such an encoded opcode characterized by attributes may be implemented as a string of binary bits in which particular bits in the string are associated with particular attributes. The value of the least significant or most significant bit in the string may, for example, indicate whether a load instruction is cacheable or non-cacheable.

The method of FIG. 5 also includes determining (514) by the cache controller from a cache directory (512) whether the data (526) is cached. Determining (514) by the cache controller from a cache directory (512) whether the data (526) is cached may be carried out by determining whether an entry in cache directory can be found having a cache address associated with the memory address requested in the load instruction.

If the data (526) is cached, the method of FIG. 5 continues by returning (516) the data (526) in the memory address from the write-back cache (522) without affecting the write-back cache's (522) state. Returning (516) the data (526) in the memory address from the write-back cache (522) without affecting the write-back cache's (522) state may be carried out by loading the data in a register associated with the consumer without modifying any least recently used attributes associated with the data.

If the data (526) is not cached, the method of FIG. 5 continues by returning (518) the data (526) from main memory (524) without affecting the write-back cache's (522) state. Returning (518) the data (526) from main memory (524) without affecting the write-back cache's (522) state may be carried out by loading the data from the main memory to a register associated with the consumer without allocating space in the cache and copying the data retrieved from main memory into the allocated space.

The method of FIG. 5 is applied by the cache controller to all non-cacheable memory load instructions. That is, the cache controller will process all non-cacheable memory load instructions, without regard to consumer identification, by determining whether the data is cached, returning the data from the write-back cache without affecting the cache's state if the data is cached, and returning the data from main memory without affecting the cache's state if the data is not cached.

Figure 6:
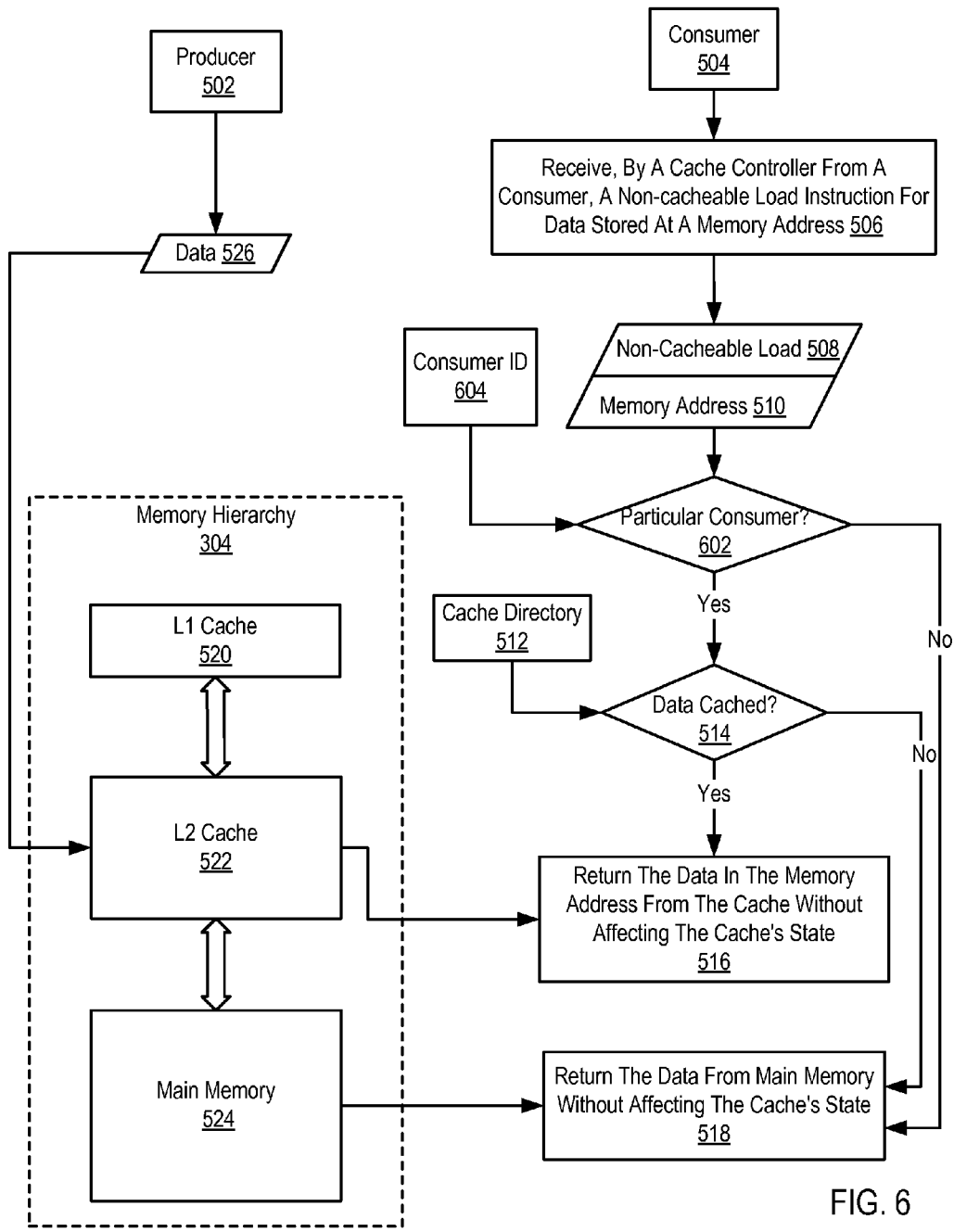
FIG. 6 sets forth a flow chart illustrating a further exemplary method of administering non-cacheable memory load instructions in an environment where cacheable data is produced and consumed in a coherent manner without harming performance of the producer according to embodiments of the present invention.

For further explanation, FIG. 6 sets forth a flow chart illustrating a further exemplary method of administering non-cacheable memory load instructions in an environment where cacheable data is produced and consumed in a coherent manner without harming performance of the producer according to embodiments of the present invention. In the method of FIG. 6, such an environment includes a hierarchy of memory that, in turn, includes one or more caches (520, 522) backed by main memory (524). In the example of FIG. 6, the L2 cache (522) is configured as a write-back cache, the L1 cache (520) is configured as a write-through cache, and the caches are controlled by a cache controller.

The method of FIG. 6 is similar to the method of FIG. 5 including, as it does, receiving (506), by the cache controller from a consumer, a non-cacheable memory load instruction for data stored at a memory address, the data treated by the producer as cacheable; determining (514) by the cache controller from a cache directory whether the data is cached; if the data is cached, returning (516) the data in the memory address from the write-back cache without affecting the write-back cache's state; and if the data is not cached, returning (518) the data from main memory without affecting the write-back cache's state.

The method of FIG. 6 differs from the method of FIG. 5, however, in that, the method of FIG. 5 is applied to only non-cacheable memory load instructions from particular consumers. The method of FIG. 6 also includes determining (602) by the cache controller that the consumer (504) is such a particular consumer for which the method is to be applied. Determining (602) by the cache controller that the consumer (504) is such a particular consumer may be carried out through the use of a consumer identification (604). Examples of a consumer identification include a software thread ID, hardware thread ID, process ID, processor ID, core ID, port ID, software pipeline stage ID, IP block ID, and so on as will occur to those of skill in the art.

In the method of FIG. 6, if the consumer (504) is a particular consumer the method continues by determining (514) whether the data is cached, if the data is cached, returning (516) the data from the cache without affecting the cache's state, and if the data is not cached, returning (518) the data from main memory without affecting the cache's state. If the consumer is not a particular consumer, the method of FIG. 6 continues by returning data from main memory—thereby bypassing the cache completely.

Figure 7:
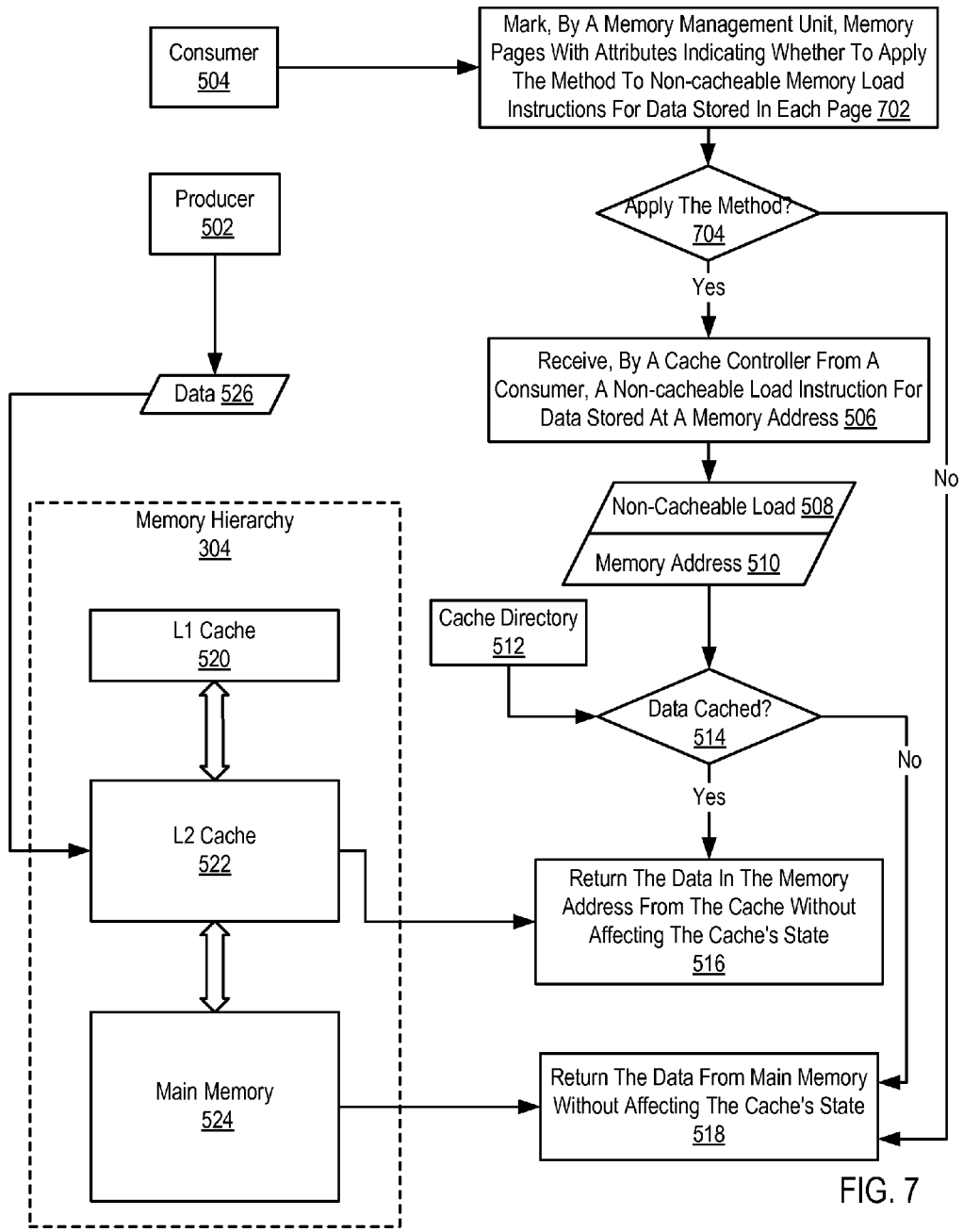
FIG. 7 sets forth a flow chart illustrating a further exemplary method of administering non-cacheable memory load instructions in an environment where cacheable data is produced and consumed in a coherent manner without harming performance of the producer according to embodiments of the present invention.

For further explanation, FIG. 7 sets forth a flow chart illustrating a further exemplary method of administering non-cacheable memory load instructions in an environment where cacheable data is produced and consumed in a coherent manner without harming performance of the producer according to embodiments of the present invention. In the method of FIG. 7, such an environment includes a hierarchy of memory that, in turn, includes one or more caches (520, 522) backed by main memory (524). In the example of FIG. 6, the L2 cache (522) is configured as a write-back cache, the L1 cache (520) is configured as a write-through cache, and the caches are controlled by a cache controller.

The method of FIG. 7 is similar to the method of FIG. 5 including, as it does, receiving (506), by the cache controller from a consumer, a non-cacheable memory load instruction for data stored at a memory address, the data treated by the producer as cacheable; determining (514) by the cache controller from a cache directory whether the data is cached; if the data is cached, returning (516) the data in the memory address from the write-back cache without affecting the write-back cache's state; and if the data is not cached, returning (518) the data from main memory without affecting the write-back cache's state.

The method of FIG. 7 differs from the method of FIG. 5, however, in that, the method of FIG. 7 also includes marking (702), by a memory management unit, memory pages with attributes indicating whether to apply the method to non-cacheable memory load instructions for data stored in each page. Marking memory pages with attributes indicating whether to apply the method to non-cacheable memory load instructions for data stored in each page may include setting one or more binary bits in a page table to indicate whether to apply the method to a particular page. The one or more binary bits may be included in a string of bits where the string of bits represents various attributes of a particular memory page. Examples of other typical page attributes include an indication of whether a page is cacheable, an indication of whether a page is read-only, an indication of whether a page is a supervisor page or a user page, an indication of whether a page is dirty, and so on as will occur to those of skill in the art.

The method of FIG. 7 also includes determining whether to apply the method to non-cacheable memory load instructions. Determining whether to apply the method to non-cacheable memory load instructions may include determining whether a memory page, containing data requested in a non-cacheable memory load instruction, is marked with attributes indicating whether to apply the method to non-cacheable memory load instructions for data stored in the page. If the method is to be applied, the method of FIG. 7 continues by receiving by the cache controller the non-cacheable load instruction, determining whether the data is cached, if the data is cached, returning the data from cache, and if the data is not cached, returning the data from main memory. If the method is not to be applied, the method of FIG. 7 continues by returning the data only from main memory, thereby bypassing the cache.

Readers will recognize in view of the explanations provided above that administering non-cacheable load instructions according to embodiments of the present invention provides the following benefits:

Providing to a consumer coherent access to data across multiple levels of memory in a memory hierarchy, where such a memory hierarchy includes a write-back cache.

Providing to a consumer access to data without affecting a write-back cache's state, regardless of whether the data is stored in the write-back cache or main memory.

Providing to a producer an environment in which the performance of the producer is not harmed by a consumer's access to data produced by the producer, especially in cases where the consumer's access is infrequent.

Exemplary embodiments of the present invention are described largely in the context of a fully functional computer system for administering non-cacheable memory load instructions. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media.

Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering non-cacheable memory load instructions in a computing environment where cacheable data is produced and consumed in a coherent manner without harming performance of a producer, the environment comprising a hierarchy of computer memory that includes one or more caches backed by main memory, the caches controlled by a cache controller, at least one of the caches configured as a write-back cache, the method comprising:

receiving, by the cache controller from a consumer, a non-cacheable memory load instruction for data stored at a memory address, the data treated by the producer as cacheable;

determining by the cache controller from a cache directory whether the data is cached;

if the data is cached, returning the data in the memory address from the write-back cache without affecting the write-back cache's state; and if the data is not cached, returning the data from main memory without affecting the write-back cache's state.

2. The method of claim 1 wherein the method is applied by the cache controller, to all non-cacheable memory load instructions.

3. The method of claim 1 further comprising marking, by a memory management unit, memory pages with attributes indicating whether to apply the method to non-cacheable memory load instructions for data stored in each page, wherein the method is applied only to non-cacheable memory load instructions for data stored in memory pages marked with the attributes.

4. The method of claim 1 wherein the method is applied to only non-cacheable memory load instructions from particular consumers for which the method is to be applied and the method further comprises:

determining by the cache controller that the consumer is a particular consumer for which the method is to be applied.

5. The method of claim 1 wherein the method is implemented on a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers; and at least one IP block further comprises the hierarchy of memory.

6. The method of claim 5 wherein each IP block comprises a reusable unit of synchronous or asynchronous logic design used as a building block for data processing within the NOC.

7. Apparatus for administering non-cacheable memory load instructions in a computing environment where cacheable data is produced and consumed in a coherent manner without harming performance of a producer, the environment comprising a hierarchy of computer memory that includes one or more caches backed by main memory, the caches controlled by a cache controller, at least one of the caches configured as a write-back cache, the apparatus comprising a computer processor, a computer memory operatively coupled to the computer processor, the computer memory having disposed within it computer program instructions capable of:

receiving, by the cache controller from a consumer, a non-cacheable memory load instruction for data stored at a memory address, the data treated by the producer as cacheable;

determining by the cache controller from a cache directory whether the data is cached;

if the data is cached, returning the data in the memory address from the write-back cache without affecting the write-back cache's state; and if the data is not cached, returning the data from main memory without affecting the write-back cache's state.

8. The apparatus of claim 7 wherein the wherein the apparatus is configured to operate in a mode in which the cache controller processes all non-cacheable memory load instructions in a coherent manner without harming performance of a producer.

9. The apparatus of claim 7 further comprising computer program instructions capable of marking, by a memory management unit, memory pages with attributes indicating whether to apply the method to non-cacheable memory load instructions for data stored in each page, wherein the apparatus is configured to operate in a mode in which only non-cacheable memory load instructions for data stored in memory pages marked with the attributes are processed in a coherent manner without affecting the write-back cache's state.

10. The apparatus of claim 7 wherein the apparatus is configured to operate in a mode in which only non-cacheable memory load instructions from particular consumers are processed in a coherent manner without affecting the write-back cache's state; and the apparatus further comprises computer program instructions capable of determining, by the cache controller, that the consumer is a particular consumer.

11. The apparatus of claim 7 further comprising a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, wherein at least one IP block further comprises the hierarchy of memory.

12. The apparatus of claim 11 wherein each IP block comprises a reusable unit of synchronous or asynchronous logic design used as a building block for data processing within the NOC.

13. A computer program product for administering non-cacheable memory load instructions in a computing environment where cacheable data is produced and consumed in a coherent manner without harming performance of a producer, the environment comprising a hierarchy of computer memory that includes one or more caches backed by main memory, the caches controlled by a cache controller, at least one of the caches configured as a write-back cache, the computer program product disposed in a computer-readable recordable signal bearing medium, the computer program product comprising computer program instructions capable of:

receiving, by the cache controller from a consumer, a non-cacheable memory load instruction for data stored at a memory address, the data treated by the producer as cacheable;

determining by the cache controller from a cache directory whether the data is cached;

if the data is cached, returning the data in the memory address from the write-back cache without affecting the write-back cache's state; and if the data is not cached, returning the data from main memory without affecting the write-back cache's state.

14. The computer program product of claim 13 wherein the wherein the computer program product is configured to operate in a mode in which the cache controller processes all non-cacheable memory load instructions in a coherent manner without harming performance of a producer.

15. The computer program product of claim 13 further comprising computer program instructions capable of marking, by a memory management unit, memory pages with attributes indicating whether to apply the method to non-cacheable memory load instructions for data stored in each page, wherein the computer program product is configured to operate in a mode in which only non-cacheable memory load instructions for data stored in memory pages marked with the attributes are processed in a coherent manner without affecting the write-back cache's state.

16. The computer program product of claim 13 wherein the computer program product is configured to operate in a mode in which only non-cacheable memory load instructions from particular consumers are processed in a coherent manner without affecting the write-back cache's state; and the computer program product further comprises computer program instructions capable of determining, by the cache controller, that the consumer is a particular consumer.

17. The computer program product of claim 13 wherein the computer program instructions are capable of execution upon a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, wherein at least one IP block further comprises the hierarchy of memory.

18. The computer program product of claim 17 wherein each IP block comprises a reusable unit of synchronous or asynchronous logic design used as a building block for data processing within the NOC.

* * * * *